Nov. 17, 1964 D. J. NEWMAN 3,157,547
SEPARATION FILM AND PROCESS
Filed April 17, 1961
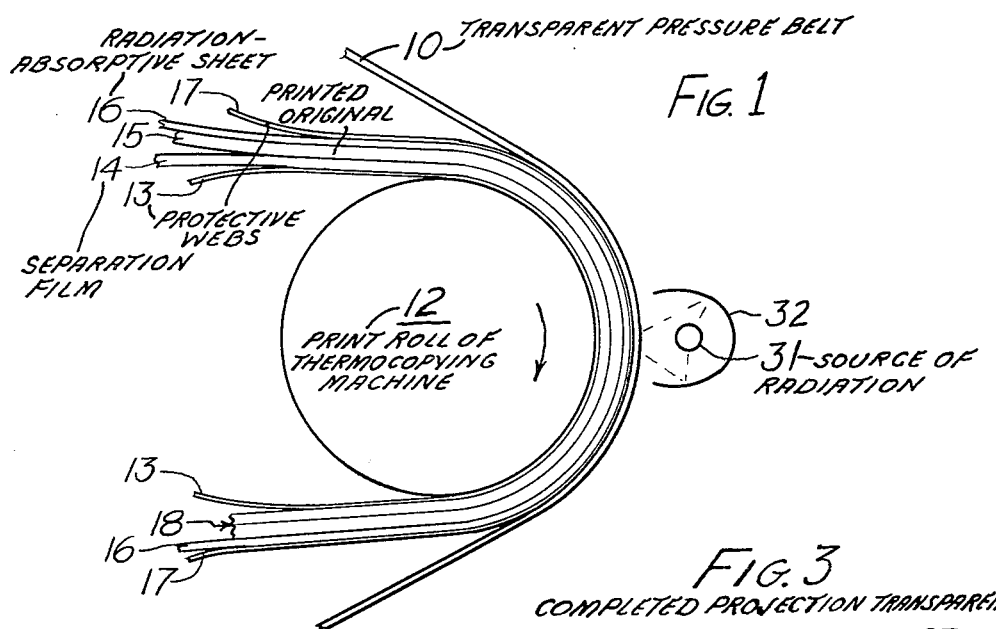
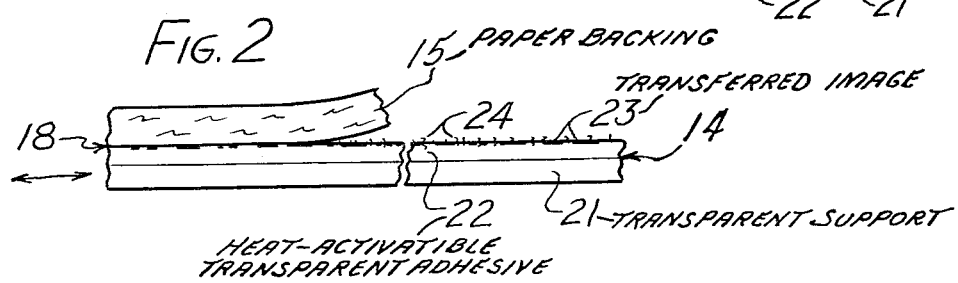
INVENTOR
DONALD J. NEWMAN
by Carpenter, Abbott, Coulter + Kinney
ATTORNEYS

3,157,547
SEPARATION FILM AND PROCESS
Donald J. Newman, White Bear Lake, Minn., assignor to Minnesota Mining and Manufacturing Company, St. Paul, Minn., a corporation of Delaware
Filed Apr. 17, 1961, Ser. No. 103,454
5 Claims. (Cl. 156—234)

This invention relates to the preparation of positive or projection transparencies which may be used in contact photoprinting processes, in the projection of light-images, in the control of color values and for other purposes. In one important embodiment, these transparencies are prepared from half-tone printed originals by a process involving a thermal treatment of a novel print-removal film material in contact with the printed original and employing a thermocopying machine.

A suitable copying machine, described in U.S. Patent No. 2,891,165, comprises a print roll and associated transparent belt between which a graphic original and a heat-sensitive copy-sheet are held in pressure-contact while the original is briefly exposed to intense irradiation. These "Thermo-Fax" thermocopying machines are available in many offices and other locations and provide high convenient means for the practice of the present invention.

It is frequently found desirable to project representations of printed pictures or other intelligence for purposes of enlargement or for simultaneous viewing by a large audience or for other purposes. Printed material as found in the pages of the so-called "slick-paper" magazines is particularly important for such use. The originals may be projected by reflection; but unless complex and expensive optical systems are employed, the image is reversed. The original is enclosed within the projector and hence is not accessible for marking during projection. More particularly, the projected image is dim, and cannot be brightened by substitution of more powerful light sources due to the severe heating effects encountered; so that such systems must be used in darkened rooms.

The present invention provides for the separation from the printed page of the inked image as a positive transparency from which a positive image may be obtained by projection, for example by means of an overhead projector. The transparency retains the full color values of the original and permits projection of an image at high light intensity. The projected image is a true reproduction of the printed original. On an overhead projector the transparency is fully accessible for marking by the operator during lectures or demonstrations, and the sheet is receptive of markings applied with wax pencil or analogous marking means.

In the practice of the invention, a heat-activatible adhesive-coated film is first adhered to the printed surface of which a transparency is desired, and which may be a page taken from a "slick-paper" magazine, by passing the composite, together with a radiation-absorptive heater sheet, through the thermocopying machine. The composite is then treated to release the ink layer and remove any surface fibers or fillers still adhering to the film surface. The ink forming the original design or image remains bonded to the adhesive surface and a positive transparency results. The surface from which the fibrous sheet has just been removed remains rough and semi-translucent, and images obtained by projection through such products lack full clarity and brilliance. It has been found, additionally, that the film may be improved in transparency and in addition made non-adherent toward other surfaces, and without any loss of detail or color separation, by spreading over the inked surface a thin uniform application of an aqueous dispersion of microparticles of a film-forming non-tacky transparent resinous polymer.

In the drawing,
FIGURE 1 is a partial sectional view illustrating the treatment of the composite of original and separation film in a "Thermo-Fax" thermocopying machine,
FIGURE 2 is a schematic representation in cross section of a portion of the composite during subsequent separation, and
FIGURE 3 is a schematic representation, also in section, of the completed projection transparency.

The apparatus of FIGURE 1 is indicated as including a print roll 12, transparent pressure belt 10, and a lamp assembly consisting of a line filament lamp 31 within a reflector 32 having a truncated elliptical cross section. Radiation from the lamp is concentrated along a narrow line near the surface of the roller 12 and parallel to its axis. The composite of sheets to be irradiated is passed between the roll 12 and the belt 10 in the direction indicated and at constant speed, and is thereby briefly irradiated at high intensity.

As shown in the figure, the composite consists of inner and outer thin protection sheets 13 and 17 which are transmissive of the heat-producing radiation and which may conveniently be thin dense paper lightly treated with silicone resin. Such treated paper is available as protective wrapping or inter-leaf material. The composite additionally includes the separation film 14, the printed original 15, and preferably a thin radiation-absorptive heater sheet 16. The last-named sheet may be omitted in instances in which the original 15 is itself adequately radiation-absorptive.

Radiation from the lamp 31 is absorbed substantially completely in the heater sheet 16 and converted to heat which is then conducted to the original 15 and separation sheet 14, causing the two to adhere together in the form of a composite 18. This material is next treated to remove the undesired portions of the printed page, as schematically illustrated in connection with FIGURE 2. The sheet material is first soaked in an aqueous detergent solution, resulting in a softening of the printed original 15, more particularly at the heavily pigmented and sized printed surface, thus permitting the bulk of the fibrous sheet to be lifted from the inked image here indicated by a series of darkened areas 23. Separation is incomplete, there being numerous fibers and pigmentary deposits 24 remaining attached to the exposed surface. These deposits are then loosened by gentle hand rubbing with a piece of mohair or other soft brush-like material while the sheet is still wet with the detergent solution. The surface is finally rinsed with clear water and the sheet is dried.

Following the washing and drying step, the surface of the separation sheet with the attached ink areas is found to be rough and uneven in character. When placed on the overhead projector and an image projected on the screen, it is found that the image is generally less bright and less sharp in outline than might be desired. The inked surface is next uniformly coated with a thin layer of a resinous latex applied with a saturated sponge, and the sheet is again dried. Projections made with the transparency thus treated are found to be sharp in detail, to provide excellent color value, and to be exceptionally brilliant in over-all appearance.

FIGURE 3 illustrates in cross section the completed transparency including the transparent film base 21 and transparent adhesive layer 22 making up the separation film 14, the transferred ink areas 23 forming the image, and the transparent surface layer 25. As illustrated in the figure, the application of the surface layer 25 provides a smooth outer surface, fills all pockets or voids in the inked surface, and insures a direct optical path through the entire structure, without in any way disturbing the position or sharpness of outline of the inked areas 23.

The structure employed in the separation film is indicated in FIGURES 2 and 3 as consisting essentially of a transparent film backing or carrier 21 and a heat-activatible transparent adhesive layer 22. Although other formulations may perhaps be useful under other operating conditions, it is found that quite specific requirements must be met when employing the "Thermo-Fax" thermocopying machine as above described and indicated. The adhesive must be substantially non-tacky at normal room and storge temperature, but must soften quickly, undergo plastic flow under moderate pressure, and become aggressively tacky when rapidly heated to moderately elevated temperatures of the order of 60–120° C. At the same time the adhesive must harden to its initially firm and non-tacky state immediately upon being cooled again to room temperature. A product which has been found to give excellent results under the conditions described will now be described.

*Example 1*

| | Parts by weight |
|---|---|
| Viny acetate homopolymer ("Vinylite AYAT") | 40 |
| 3:1 vinyl stearate:vinyl acetate copolymer ("Flexbond B-142") | 20 |
| Vinyl stearate homopolymer ("Flexbond D-108") | 20 |
| Diphenyl phthalate | 8 |
| Toluene | 153 |
| Methylethyl ketone | 52 |

The solid components are dissolved in the mixture of solvents and applied in a thin uniform coating to two-mil Mylar oriented polyester film, and the coating is dried. A dry coating weight to produce a coating thickness equivalent to that of at least about one gram per square foot of the adhesive is necessary in order to obtain complete removal of the inked areas from the printed page. Above about 5 grams per square foot the coating shows an increased milkiness or translucency which is to be avoided, and coatings of such thicknesses are in any event unnecessary and economically undesirable.

Films ranging from as thin as about one-half mil up to about 10 mils, of Mylar polyester or other transparent water-resistant films having adequate handling properties such as cellulose acetate or copolymer of styrene and acrylonitrile, may also be used.

The transparent film constructed as above indicated is essentially non-tacky to the touch, but when placed with the adhesive surface against the printed surface of a page of a "slick-paper" magazine and the composite passed through the thermocopying machine as hereinbefore indicated, the adhesive is softened sufficiently so that, under the pressure contact applied in the machine, it attains full and complete adhesion to the ink pattern throughout its entire area. All of the half-tone dots of pictured illustrations as well as the solid areas of printed letters and the like are effectively bonded to the adhesive coating. The adhesive additionally forms a bond to the clay-coated and fibrous surface of the background areas of the printed page, which bond must accordingly be subsequently broken to permit separation and isolation of the inked image.

This separation is achieved, as previously noted, by brief soaking of the entire composite in water at room temperature and to which has been added small amounts of detergent or wetting agent. Any of the commercially available detergents are effective such as those based on sulfated alcohols, sodium lauryl sulfate or others; and the concentration is in no way critical. These may be further compounded with trisodium phosphate or similar modifiers or builders. One commercially available product is "Spick-n-Span," a proprietary blend of 20 parts of trisodium phosphate, 9 parts of dodecyl benzene sulfonate, and 71 parts of inert additive.

Within one or two minutes the paper absorbs the solution and the clay coating is softened and weakened to such an extent that the fibrous backing may be floated or lifted away without difficulty. The remaining thin coating of clay, water soluble binder, loose fibers and other residual material is then easily loosened by gentle rubbing with a soft brush or brush-like implement and is then rinsed away with clear water.

The cleaned but still wet copy is preferably dried between absorbent towels to prevent water spotting. The drying may be completed by exposure to moving air at moderately elevated temperature.

The imaged surface is next further transparentized by the application of a thin coating of a film-forming polymer applied in the form of microparticles in aqueous dispersion. A preferred material is "Darex Polymer Y," a polyvinyl acetate copolymer colloidal latex containing 30% solids, the polymer having a molecular weight of about 14,000 and forming a hard and non-tacky self-sustaining film when the latex is dried in film form. Another suitable material is "Everflex MC-400" vinyl acetate/ethyl acrylate copolymer colloidal emulsion which on drying forms transparent and non-tacky but somewhat softer dried film.

Whereas the dried transparency as initially formed shows considerable tendency to stick to surfaces with which in contact at room or moderately elevated temperatures, the product after the application of the polymer latex exhibits no such tendency. Although the microparticles of the polymer become firmly attached to the surface of the transparency and blend together to form a smooth clear surface layer, they have no visible effect on the inked image either at the larger inked areas or even at the finest half-tone dots. Color separation in the transparency thus remains fully equal to what was available in the original printed page. The brilliance of the projected image is significantly increased, making possible the effective projection from such transparencies under conditions of full room illumination.

The separation of printed images simultaneously from both surfaces of a magazine page or other printed original may be accomplished by analogous procedures by merely increasing the soaking time in the detergent solution. Each of the two resulting transparencies is then scrubbed, rinsed, dried, and brightened by application of colloidally dispersed resin as already described.

The specific adhesive formula provided in the example has given excellent results under the conditions described and is preferred, but slight modifications and variations may be made without significant loss of properties. As an example, the amount of any one of the four solid components may be varied within the limits of about one-half to about twice the amount indicated in the formula; and corresponding variations may be made in two or more of the components providing the changes are not excessive.

The process as hereinbefore described permits the preparation of projection transparencies from magazine pages or analogous sources so that graphic subject matter of all types may be easily and rapidly prepared for direct viewing or for projection. The same transparencies are equally useful in contact printing, for example in preparing multiple copies of the subject matter on diazo or other light-sensitive copy-papers.

The process of making transparencies as herein described has additional utility in the color printing industry in preparing proofs of color separations. Such proofs are particularly useful in assessing the color values of the particular printing inks employed. The process involves printing each monocolor image on decalcomania base stock, "slick-paper," or other transfer sheet, preparing a separation transparency from each of the printed monocolor images by procedures hereinbefore described, and then placing the several transparencies in register and comparing the resulting colored image with the colored original from which the separations were prepared. Any differences in the inks employed in printing the separate colors will thus be made immediately apparent and can be corrected, and again tested by way of a further set of separation transparencies.

What is claimed is as follows:

1. Process for the preparation of a clear and sharp projection transparency from a printed original which comprises the steps of (a) briefly exposing to intense radiation under moderate pressure a composite of thin flexible sheet materials comprising, in order, a first thin protective web, a radiation-absorptive heater sheet, an original printed on transfer paper, a heat-activatible adhesive separation film, and a second thin protective web, to cause brief moderate heating of said composite and bonding of said film to the printed surface of said original; (b) soaking the adherently bonded original and film in aqueous detergent solution to soften the transfer paper surface; (c) removing the paper and any residual non-image areas thereof from said film; and (d) applying to the exposed roughened print-carrying surface of said film a thin coating of resinous film-forming, vinyl copolymer aqueous latex and drying the coating, to clarify and protect the said surface.

2. The process of claim 1 in which the separation film comprises a thin flexible transparent film backing and a thin smooth coating thereon of a transparent heat-activatible normally firm and non-tacky adhesive which becomes aggressively tacky on being heated to an activation temperature within the range of about 60–120° C. and which consists essentially, in parts by weight, of vinyl acetate homopolymer about 20–60 parts; copolymer of 3 parts vinyl stearate and 1 part vinyl acetate, about 10–30 parts; vinyl stearate homopolymer, about 10–30 parts; and diphenyl phthalate about 4–12 parts.

3. A color separation sheet adapted for the preparation of clear and accurate projection transparencies from printed originals by brief moderate heating in pressure conatct with such original all as herein described, said sheet comprising a thin, flexible water-resistant transparent film backing and a normally non-tacky uniform surface layer of about 1–5 grams per square foot of a heat-activatible adhesive composition consisting essentially, in parts by weight, of vinyl acetate homopolymer about 20–60 parts; copolymer of 3 parts vinyl stearate and 1 part vinyl acetate, about 10–30 parts; vinyl stearate homopolymer, about 10–30 parts; and diphenyl phthalate about 4–12 parts.

4. A color separation sheet adapted for the preparation of clear and accurate projection transparencies from printed originals by brief moderate heating in pressure contact with such original all as herein described, said sheet comprising a thin, flexible water-resistant tarnsparent film backing and a normally non-tacky uniform surface layer of about 1–5 grams per square foot of a heat-activatible adhesive composition consisting essentially, in parts by weight, of vinyl acetate homopolymer about 40 parts; copolymer of 3 parts vinyl stearate and 1 part vinyl acetate, about 20 parts; vinyl stearate homopolymer, about 20 parts; and diphenyl phthalate about 8 parts.

5. A heat-activatible transparent adhesive composition useful in the form of a thin surface coating on a thin flexible transparent film backing as a separation film for the preparation of separation transparencies as herein described, said adhesive consisting essentially, in parts by weight, of vinyl acetate homopolymer about 20–60 parts; copolymer of 3 parts vinyl stearate and 1 part vinyl acetate, about 10–30 parts; vinyl stearate homopolymer, about 10–30 parts; and diphenyl phthalate about 4–12 parts.

References Cited in the file of this patent
UNITED STATES PATENTS

| | | |
|---|---|---|
| 2,101,876 | Scott | Dec. 14, 1937 |
| 2,154,474 | Scott | Apr. 18, 1939 |
| 2,431,078 | Powell et al. | Nov. 18, 1947 |
| 2,432,484 | Moulton | Dec. 9, 1947 |
| 2,489,987 | Barnola | Nov. 29, 1949 |
| 2,556,078 | Francis | June 5, 1951 |
| 2,559,790 | Peters | July 10, 1951 |
| 2,643,238 | Crozier et al. | June 23, 1953 |